(12) United States Patent
Cohen et al.

(10) Patent No.: US 9,857,814 B2
(45) Date of Patent: Jan. 2, 2018

(54) ON-CHIP SUPPLY GENERATOR USING DYNAMIC CIRCUIT REFERENCE

(71) Applicant: Intel Corporation, Santa Clara, CA (US)

(72) Inventors: Ariel Cohen, Modiin-Makkabbim-Reut (IL); Yoav Romach, Rishon Lezion (IL); Omer Cohen, Ashkelon (IL); Ro'ee Eitan, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,273

(22) PCT Filed: Sep. 27, 2013

(86) PCT No.: PCT/US2013/062182
§ 371 (c)(1),
(2) Date: Dec. 24, 2013

(87) PCT Pub. No.: WO2014/185949
PCT Pub. Date: Nov. 20, 2014

(65) Prior Publication Data
US 2016/0054747 A1  Feb. 25, 2016

Related U.S. Application Data

(60) Provisional application No. 61/824,924, filed on May 17, 2013.

(51) Int. Cl.
*G05F 1/56* (2006.01)
*G05F 1/567* (2006.01)
(Continued)

(52) U.S. Cl.
CPC ............... *G05F 1/56* (2013.01); *G01K 7/00* (2013.01); *G01K 7/01* (2013.01); *G05F 1/567* (2013.01);
(Continued)

(58) Field of Classification Search
CPC ... H02M 2001/0025; H02M 2001/007; H02M 3/07; G05F 1/563
See application file for complete search history.

(56) References Cited

U.S. PATENT DOCUMENTS 5,589,762 A * 12/1996 Iannuzo ............... G05F 1/468
323/282
6,006,996 A   12/1999 Bhatnagar
(Continued)

FOREIGN PATENT DOCUMENTS

CN    1591115    3/2005
CN    1956578    5/2007
(Continued)

OTHER PUBLICATIONS

International Preliminary Report on Patentability for International Application No. PCT/US2013/062182, dated Nov. 26, 2015.
(Continued)

*Primary Examiner* — Yusef Ahmed
(74) *Attorney, Agent, or Firm* — Green, Howard & Mughal, LLP

(57) ABSTRACT

Apparatus of a supply generator using dynamic circuit reference is provided which includes: a charge pump to receive a first power supply and to generate a second power supply; a voltage regulator to operate using the second power supply, the voltage regulator having an input to receive a reference and to generate a third power supply; and a reference generator to operate using the first power supply,
(Continued)

the reference generator to provide the reference according to an output of a voltage sensing block.

20 Claims, 8 Drawing Sheets

(51) Int. Cl.
    *G01K 7/00*              (2006.01)
    *G01K 7/01*              (2006.01)
    *G06F 1/26*              (2006.01)
    *H02M 3/07*             (2006.01)
    *G05F 1/46*              (2006.01)

(52) U.S. Cl.
    CPC ............... *G06F 1/26* (2013.01); *H02M 3/07* (2013.01); *G01K 2215/00* (2013.01); *G05F 1/468* (2013.01)

(56) References Cited

U.S. PATENT DOCUMENTS

| | | | | |
|---|---|---|---|---|
| 6,242,974 B1* | 6/2001 | Kunst | G01K 7/01 | 327/554 |
| 6,747,521 B1* | 6/2004 | Allott | H03L 7/0891 | 331/17 |
| 6,847,319 B1* | 1/2005 | Stockstad | G01K 7/01 | 341/119 |
| 7,212,064 B1* | 5/2007 | Schnaitter | G01K 7/015 | 327/512 |
| 7,342,455 B2* | 3/2008 | Behzad | H03F 1/0205 | 330/289 |
| 8,018,289 B1* | 9/2011 | Hu | H03L 7/14 | 327/20 |
| 8,290,171 B1* | 10/2012 | Helfrich | H04R 5/04 | 381/111 |
| 9,213,347 B2* | 12/2015 | Kim | G05F 1/575 | |
| 9,525,837 B1* | 12/2016 | Eshel | H04N 5/378 | |
| 2002/0149407 A1* | 10/2002 | Ingino, Jr. | H03K 3/0315 | 327/157 |
| 2005/0047181 A1* | 3/2005 | Yamamoto | H02M 3/07 | 363/60 |
| 2005/0062549 A1* | 3/2005 | Lin | H03L 7/0805 | 331/16 |
| 2006/0006166 A1* | 1/2006 | Chen | G05D 23/1931 | 219/494 |
| 2006/0039445 A1* | 2/2006 | McLeod | G01K 7/01 | 374/178 |
| 2006/0082351 A1* | 4/2006 | Martins | H02J 9/005 | 323/268 |
| 2006/0093016 A1* | 5/2006 | McLeod | G01K 7/01 | 374/178 |
| 2006/0141963 A1* | 6/2006 | Maxim | H03L 7/0891 | 455/192.1 |
| 2006/0164157 A1* | 7/2006 | Tschanz | G05F 3/205 | 327/537 |
| 2006/0267562 A1* | 11/2006 | Szepesi | G05F 1/577 | 323/224 |
| 2007/0052561 A1* | 3/2007 | McLeod | G01K 7/01 | 341/51 |
| 2007/0055473 A1* | 3/2007 | McLeod | G01K 1/00 | 702/130 |
| 2007/0205824 A1* | 9/2007 | Perisetty | H03K 19/0013 | 327/536 |
| 2009/0015299 A1* | 1/2009 | Ryu | H03F 1/0211 | 327/108 |
| 2009/0085538 A1* | 4/2009 | Miguchi | H02M 3/07 | 323/273 |
| 2009/0237966 A1* | 9/2009 | Soenen | H02M 3/1588 | 363/74 |
| 2010/0181982 A1* | 7/2010 | Chen | H02M 3/07 | 323/283 |
| 2010/0329487 A1* | 12/2010 | David | H03F 3/187 | 381/174 |
| 2012/0188107 A1* | 7/2012 | Ashburn, Jr. | H03M 3/344 | 341/110 |
| 2012/0194141 A1* | 8/2012 | Shi | H02J 7/0073 | 320/137 |
| 2012/0230071 A1* | 9/2012 | Kaneda | H02M 3/073 | 363/59 |
| 2012/0326695 A1* | 12/2012 | Chen | G11C 11/4074 | 323/313 |
| 2013/0076250 A1* | 3/2013 | Logiudice | H05B 33/086 | 315/161 |
| 2013/0307576 A1* | 11/2013 | Ilkov | G01R 31/2822 | 324/762.02 |
| 2013/0320955 A1* | 12/2013 | Kratyuk | H03L 1/022 | 323/313 |
| 2013/0342180 A1* | 12/2013 | Zhou | H02M 3/07 | 323/234 |
| 2014/0111173 A1* | 4/2014 | Lee | G05F 1/565 | 323/281 |
| 2014/0125504 A1* | 5/2014 | Braswell | H03M 3/344 | 341/110 |
| 2014/0341257 A1* | 11/2014 | Bernardinis | G01K 7/01 | 374/178 |
| 2015/0063420 A1* | 3/2015 | Cho | G01K 7/01 | 374/170 |
| 2015/0162826 A1* | 6/2015 | Jeong | G06F 3/00 | 327/536 |
| 2015/0194878 A1* | 7/2015 | Hu | G11C 5/145 | 365/226 |
| 2015/0346749 A1* | 12/2015 | Bernardon | G05F 1/575 | 323/274 |
| 2016/0085250 A1* | 3/2016 | Luo | G05F 1/468 | 323/281 |
| 2016/0098057 A1* | 4/2016 | Gambetta | G05F 3/26 | 323/313 |

FOREIGN PATENT DOCUMENTS

| | | |
|---|---|---|
| CN | 101257300 | 9/2008 |
| CN | 101847026 | 9/2010 |
| CN | 102195282 | 9/2011 |
| CN | 102378099 | 3/2012 |
| CN | 102882368 | 1/2013 |
| EP | 0500381 | 8/1992 |
| JP | 5115123 | 5/1993 |
| JP | 2007243178 | 9/2007 |
| JP | 2009020641 | 1/2009 |
| SU | 506840 | 3/1976 |

OTHER PUBLICATIONS

Notification of Transmittal of the International Search Report and the Written Opinion of the International Searching Authority issued for International Patent Application No. PCT/US2013/062182, 6 pages.
Office Action and Search Report for Chinese Patent Application No. 201380075705.3, dated May 4, 2016.
Office Action for Chinese Patent Application No. 201380075705.3, dated Dec. 21, 2016 (No translation available).
Extended European Search Report dated Dec. 14, 2016 for European Patent Application No. 13884830.4.
Non-Final Office Action dated Dec. 19, 2016 for Japanese Patent Application No. 2016-513917.
Notice of Preliminary Rejection dated Dec. 19, 2016 for Korean Patent Application No. 10-2015-7028865.
Lin, Chia-Hsiang et al., "Low-Dropout Regulators with Adaptive Reference Control and Dynamic Push-Pull Techniques for Enhancing Transient Performance", IEEE Transactions on Power Electronics, Institute of Electrical and Electronics Engineers, vol. PE-1, No. 4; Apr. 1, 2009, pp. 1016-1022, XP011250202.
Saw, R. et al., "Design of a 1.8V on-chip voltage generator for applications in low voltage transceiver", 2008 IEEE Asia Pacific Conference on Circuits and Systems, Piscataway, NJ, US, Nov. 30, 2008, pp. 676-679, XP031405087.
Wittman, Juergen et al., "EMC Influence of the charge pump in linear regulators—design, simulation, and measurements", 2011

(56) References Cited

OTHER PUBLICATIONS

IEEE Int'l Symposium on Circuits and Systems (ISCAS), May 15, 2011, pp. 1359-1362, XP031997886.
Notice of Last Preliminary Rejection dated Jun. 27, 2017 for Korean Patent Application No. 10-2015-7028865, no translation.
Third Office Action dated Jun. 16, 2017 for Chinese Patent Application No. 201380075705.3, no translation.
Notice of Grant dated Sep. 29, 2017 for Chinese Patent Application No. 201380075705.3.

* cited by examiner

ON-CHIP SUPPLY GENERATOR USING DYNAMIC CIRCUIT REFERENCE

CLAIM OF PRIORITY

This application claims the benefit of priority of International Patent Application No. PCT/US2013/062182 filed Sep. 27, 2013, titled "ON-CHIP SUPPLY GENERATOR USING DYNAMIC CIRCUIT REFERENCE," which claims priority to and incorporates by reference, the U.S. Provisional Patent Application No. 61/824,924 filed May 17, 2013, both of which are incorporated by reference in their entirety.

BACKGROUND

Some analog circuits require more than one supply input. Usually, in addition to the digital supply (e.g., mostly 1.0V), an additional higher supply is required. An example of that is a thermal sensor circuit, which may require a 1.25V analog supply, in addition to the 1.0V digital supply. As the trend for SoC (system-on-chip) or processor chip to reduce the number of analog circuits is becoming popular, fewer analog voltage supplies are available. Performance of analog circuits depends on a quiet analog power supply. One way to provide a quiet analog power supply for an analog circuit is to provide a dedicated supply bump for that analog circuit i.e., each analog circuit may have its own dedicated source of analog power supply. Providing an external supply bump for every single analog component is very expensive.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
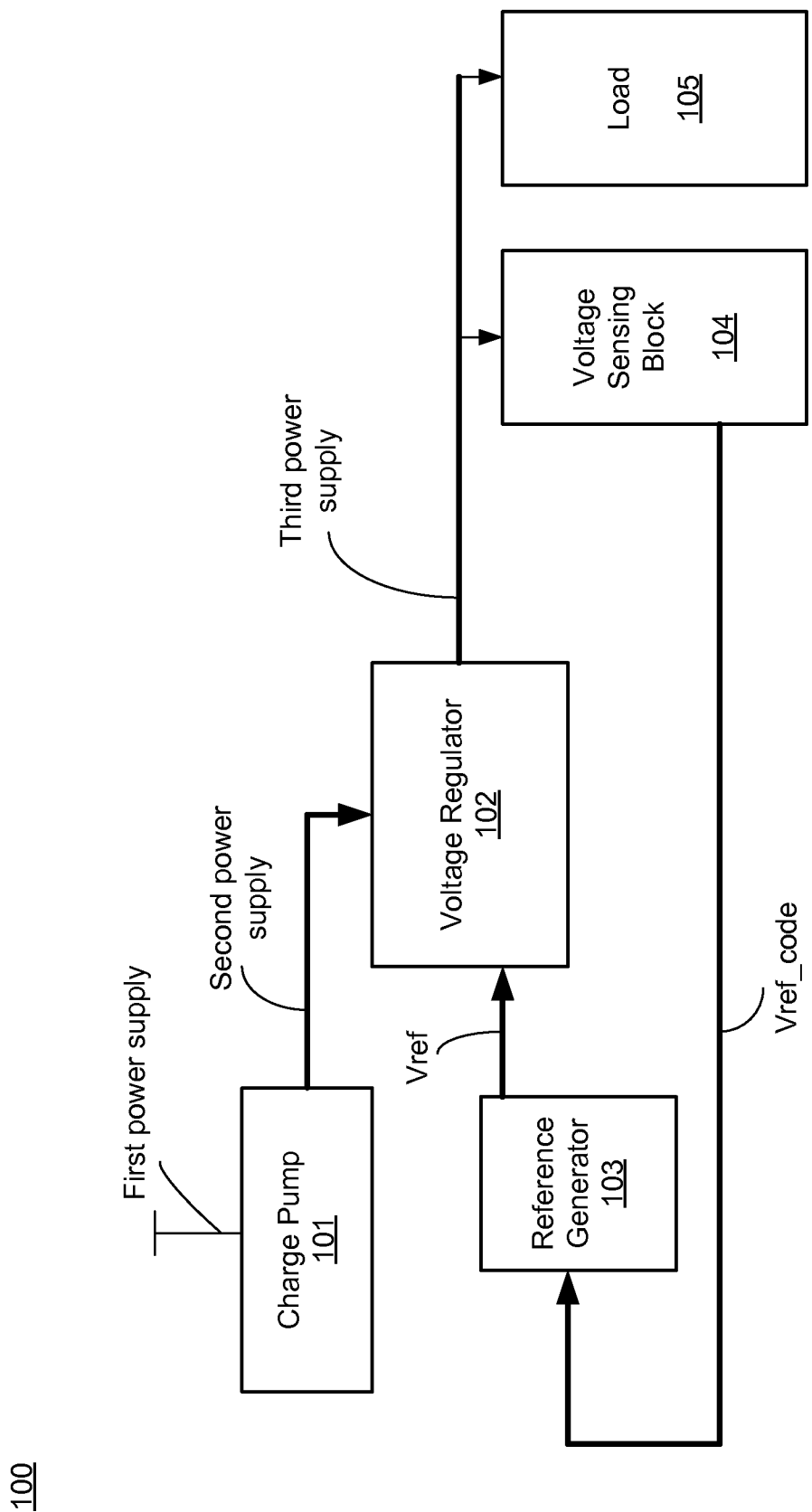
FIG. 1 illustrates a high level architecture of a power supply generator using dynamic reference, according to one embodiment of the disclosure.

The embodiments describe an apparatus which generates analog voltage, using a digital supply, with relatively high power efficiency. One technical effect of the embodiments is that it reduces or eliminates the need for an analog supply bump. In one embodiment, a dynamic, self-calibrated bandgap circuit is used to obtain the accuracy in the supplied analog voltage. The embodiments describe a power supply generator using dynamic reference to adjust power supply for a load. In one embodiment, a digital power supply (e.g., 1V, also referred here as the first power supply) is received by a charge pump which generates a higher power supply (e.g., 2.0V, also referred here as the second power supply) which is then regulated by a voltage regulator that generates a regulated analog power supply (e.g., 1.25V, also referred here as the third power supply). In one embodiment, the regulated analog power supply is provided to a voltage sensing block and to a load (e.g., thermal sensor, phase locked loop (PLL), analog-to-digital converter (ADC), etc.). In one embodiment, a reference voltage for the voltage regulator is adjusted dynamically according to changing conditions of the voltage sensing block and/or the load.

In the following embodiments, a thermal sensor is used as a voltage sensing block coupled in parallel to the load. In other embodiments, other analog circuits may be used as the voltage sensing block. For example, an ADC may be used as a voltage sensing block. In one embodiment, a dynamic self-calibrated bandgap circuit is used to obtain a highly accurate (e.g., less than 3% variation across process, voltage, and temperature variations) analog power supply without the use of a dedicated analog supply bump. In one embodiment, the power supply generator is fully integrated with the circuits of the voltage sensing block to form a feedback circuit that regulates the power supply while allowing the voltage sensing block to function for its purpose. In one embodiment, the power supply generator is based on a switch capacitor charge pump integrated with a thermal sensor sigma-delta analog-to-digital converter (SD-ADC) with dynamic bandgap reference to provide an accurate analog power supply for the thermal sensor (i.e., voltage sensing block). In one embodiment, the SD-ADC samples its own power supply (i.e., third power supply) with a dynamic bandgap voltage supplied by the thermal sensor's sense stage.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and the include plural references. The meaning of in includes in and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates a high level architecture 100 of a power supply generator using dynamic reference, according to one embodiment of the disclosure. In one embodiment, architecture 100 comprises a charge pump 101, voltage regulator 102, reference generator 103, and voltage sensing block 104 (e.g., thermal sensor, ADC, etc.), and load 105.

In one embodiment, charge pump 101 receives a first power supply and generates a higher second power supply using the first power supply. For example, charge pump 101 receives a low digital power supply of 1V as the first power supply and pumps that first power supply using switch capacitors to generate a higher unregulated second power supply of 1.5V or 2.0V. An exemplary embodiment of charge pump 101 is described with reference to FIG. 3.

Referring back to FIG. 1, in one embodiment, voltage regulator 102 receives the second power supply as input power supply and generates a regulated third power supply for voltage sensing block 104. In one embodiment, voltage regulator 102 compares a reference voltage Vref with a divided down version of third power supply to regulate the third power supply. In one embodiment, voltage regulator 102 is a low dropout (LDO) voltage regulator. In other embodiments, other types of voltage regulators may be used. An exemplary embodiment of voltage regulator 102 is described with reference to FIG. 4.

Referring back to FIG. 1, in one embodiment, reference generator 103 provides Vref to voltage regulator 102 according to Vref_code. In one embodiment, Vref_code is a digital code that adjusts resistance of a resistor (or transistor) of reference generator 103. In one embodiment, Vref_code may be an analog signal to control resistance of a resistor (or transistor) of reference generator 103. In one embodiment, Vref_code is adjusted by a SD-ADC (not shown) of the voltage sensing block 104 after sampling the third power supply with dynamic bandgap voltage. In one embodiment, voltage sensing block 104 (which is mostly an analog circuit) receives an accurate third power supply and provides Vref_code for reference generator 103 to adjust Vref to regulate the third power supply.

Figure 2:
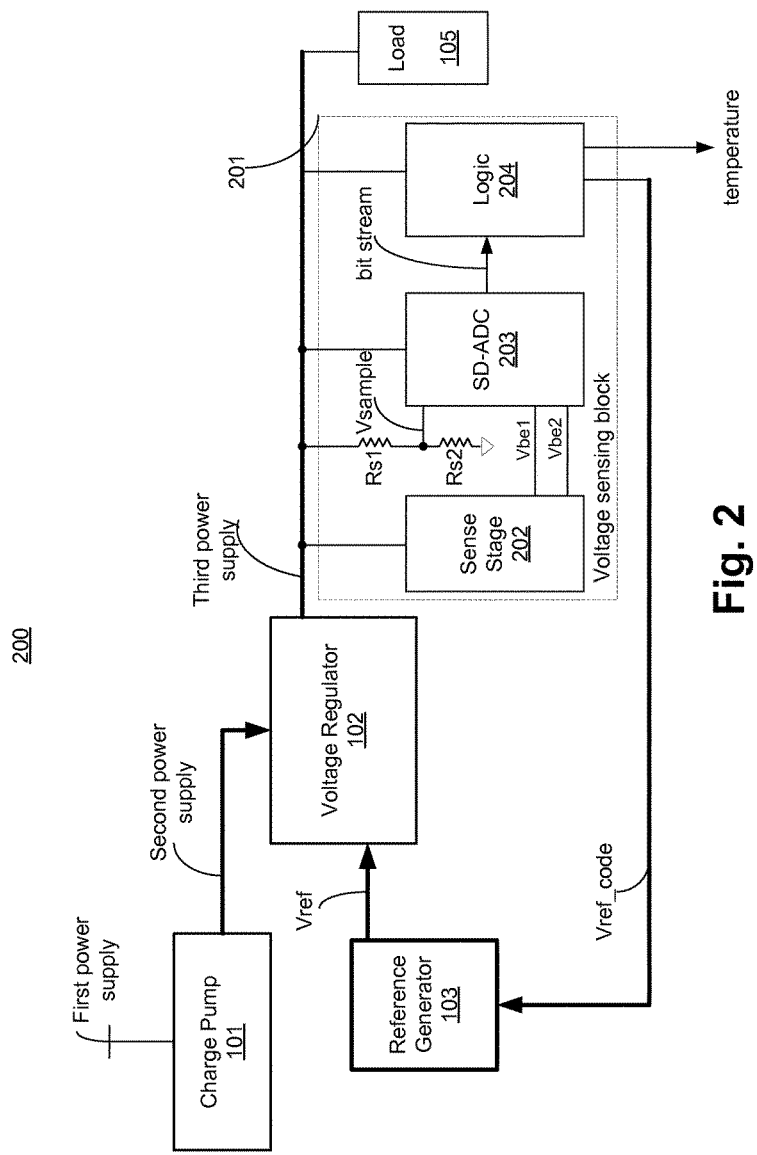
FIG. 2 illustrates architecture of power supply generator for a thermal sensor using dynamic reference, according to one embodiment of the disclosure.

FIG. 2 illustrates architecture 200 of power supply generator for a thermal sensor using dynamic reference, according to one embodiment of the disclosure. It is pointed out that those elements of FIG. 2 having the same reference numbers (or names) as the elements of any other figure can operate or function in any manner similar to that described, but are not limited to such.

In this embodiment, a thermal sensor 201 is used as voltage sensing block 104. In one embodiment, voltage sensing block 201 comprises a sense stage 202, SD-ADC 203, logic 204, and sampling circuit with resistors Rs1 and Rs2. In one embodiment, sense stage 202 comprises current sources and two sets of diodes. In one embodiment, the first set of diode provides Vbe1 (i.e., base-emitter voltage) and the second set of diodes provides Vbe2. In this embodiment, sense stage 202 operates using third power supply. In one embodiment, the difference of Vbe1 and Vbe2 is used to determine temperature of the diodes of the sense stage 201.

In one embodiment, sampling circuit comprises a voltage divider having resistors Rs1 and Rs2 coupled together as shown to provide Vsample, which is a divided down voltage of third power supply. In one embodiment, resistors Rs1 and Rs2 are of equal resistance values. In such an embodiment, Vsample is half of third power supply. In other embodiments other resistance ratios of resistors Rs1 and Rs2 may be used to adjust the level of Vsample. In one embodiment, resistors Rs1 and Rs2 each are a number of parallel resistors that can be enabled or disabled. In one embodiment, resistors Rs1 and Rs2 are implemented as transistors. In other embodiments, resistors Rs1 and Rs2 can be implemented as poly resistors or combination of transistors and poly resistors. In one embodiment, SD-ADC 203 receives Vsample and samples it using Vbe1 and Vbe2. In one embodiment, SD-ADC 203 includes a first order sigma-delta modulator. In one embodiment, SD-ADC 203 includes a second order sigma-delta modulator. In other embodiments, higher order of SD-ADC 203 may be used. In one embodiment, SD-ADC 203 is time-interleaved ADC. In one embodiment, output of SD-ADC 203 is a bit stream which is received by logic 204.

In one embodiment, logic 204 is a digital filter. In one embodiment, digital filter is one of finite impulse response (FIR) filter, infinite impulse response (IIR) filter, cascaded integrator-comb (CIC) low pass filter, etc. In one embodiment, logic 204 comprises three stages of CIC low pass filter. In one embodiment, the CIC filter configuration has configurable decimation ratio of 64 or 256. In one embodiment, logic 204 generates a temperature reading (or measurement). In one embodiment, logic 204 also generates Vref_code for adjusting Vref. In one embodiment, logic 204 also generates phases for SD ADC 203. In one embodiment, logic 204 also has a calibration FSM (finite state machine) to calibrate Vref and the third power supply. One embodiment, of logic 204 is described with reference to FIG. 6. One embodiment of the calibration FSM state diagram is described with reference to FIG. 7.

Referring back to FIG. 2, in one embodiment, virtual Vbg (i.e., dynamic bandgap reference voltage) is created using dynamic sense stage 202. In one embodiment, current drawn on the two sets of diodes and voltages Vbe1 and ΔVbe (i.e., Vbe2−Vbe1) are measured. Vbe1 (and Vbe2) are complementary to absolute temperature (CTAT), and ΔVbe is proportional to absolute temperature (PTAT). In this embodiment, virtual Vbg is expressed as Vbe+α*ΔVbe, where a is a constant multiplier (e.g., 16), and virtual Vbg is substantially constant with changes in temperature.

The base-emitter voltage of a bipolar transistor (or a PN junction diode) in its forward-active region can be described by the following well known logarithmic equation:

$$V_{BE}(T) = \frac{kT}{q} \ln\left(\frac{I_{bias}(T)}{I_S(T)}\right)$$

where k is Boltzmann's constant, q is the electron charge, T is the absolute temperature, $I_s$ is the transistor's saturation current, and $I_{bias}$ is its collector current, determined by a bias circuit. As a result of the strong temperature dependency of the saturation current $I_s$, the base-emitter voltage has a negative temperature coefficient, e.g., of about 2 mV/° C. The exact value depends on the absolute value of $I_s$ and $I_{bias}$. The extrapolated value of Vbe to 0K (zero Kelvin) is related to the silicon bandgap energy. This voltage is independent of the absolute values of and $I_s$ and $I_{bias}$.

In one embodiment, bandgap reference can be used as the reference voltage of SD-ADC 203. In one embodiment, virtual Vbg (or dynamic reference voltage) is generated by adding an amplified version of ΔVbe to Vbe to obtain a temperature-independent voltage virtual Vbg. Virtual Vbg can be expressed as:

$$V_{REF} = V_{BE} + \alpha \cdot \Delta V_{BE}$$

In one embodiment, SD-ADC 203 converts the ratio of α*ΔVbe and virtual Vbg to contain digital temperature (i.e., output of logic 204), which can be expressed as:

$$Dout = \frac{\alpha \Delta V_{BE}}{V_{BE} + \alpha \Delta V_{BE}}$$

In one embodiment, SD-ADC 203 converts Vsample such as:

$$Dout = V_{sample}/(V_{BE} + \alpha \Delta V_{BE})$$

Figure 3:
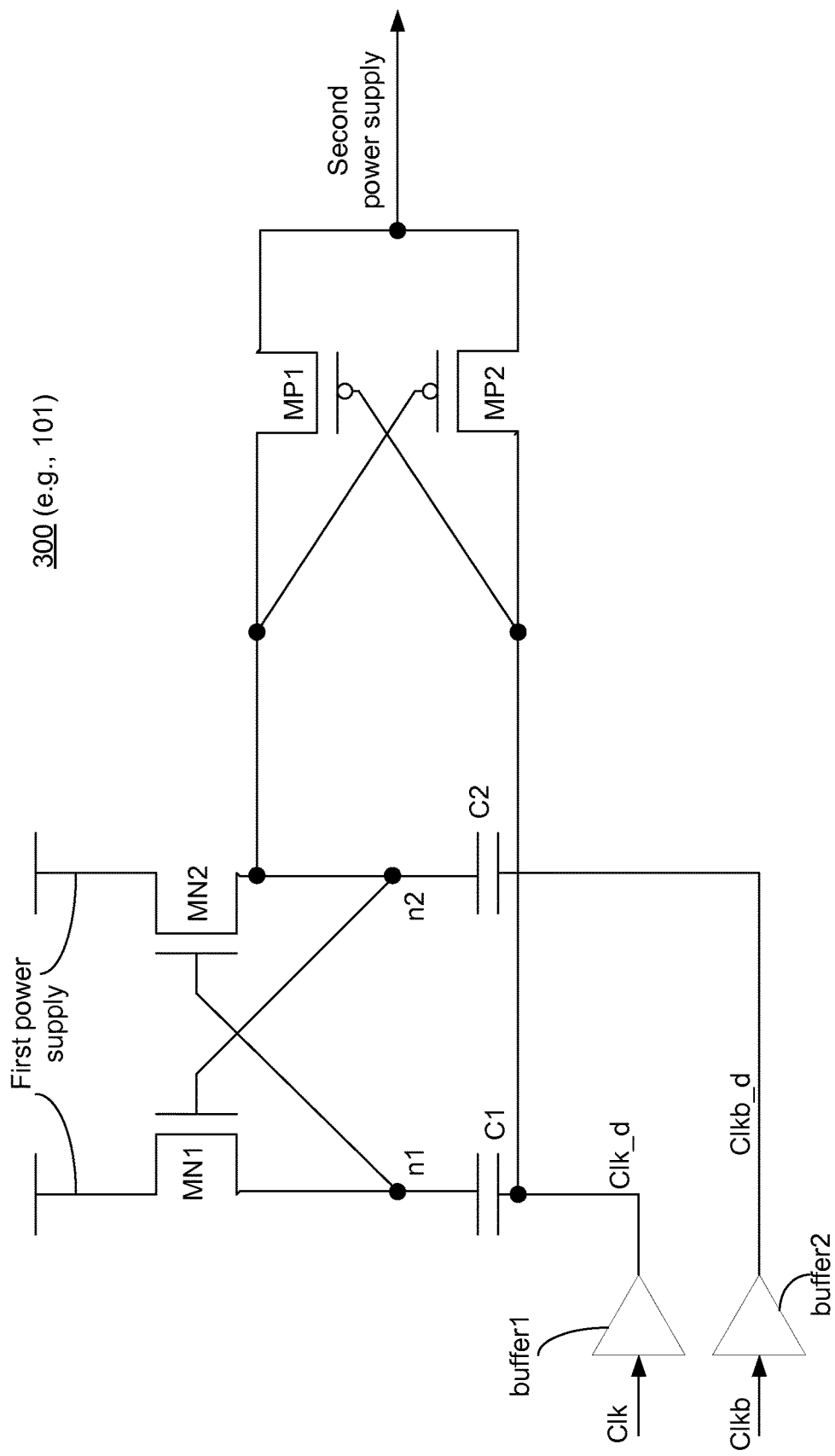
FIG. 3 illustrates a charge pump for the power supply generator, according to one embodiment of the disclosure.

FIG. 3 illustrates a charge pump 300 for the power supply generator, according to one embodiment of the disclosure. It is pointed out that those elements of FIG. 3 having the same reference numbers (or names) as the elements of any other figure can operate or function in any manner similar to that described, but are not limited to such.

In one embodiment, charge pump 300 (e.g., 101) comprises switching capacitors C1 and C2, cross-coupled n-type transistors MN1 and MN2, cross-coupled p-type transistors MP1 and MP2, and clock buffers buffer1 and buffer2. In one embodiment, clock buffer1 receives clock signal Clk and generates a buffered version Clk_d. In one embodiment, clock buffer 2 receives inverse of Clk signal i.e., Clkb, and generates its buffered version Clkb_d. In one embodiment, Clkd is received by one end of capacitor C1. In one embodiment, the other end (i.e., node n1) of capacitor C1 is coupled to source terminal of MN1 and gate terminal of MN2. In one embodiment, drain terminals of MN1 and MN2 are coupled to first power supply.

In one embodiment, Clkb_d is received by one end of capacitor C2. In one embodiment, the other end (i.e., node n2) of capacitor C2 is coupled to source terminal of MN2 and gate terminal of MN1. In one embodiment, source terminal of MN1 (i.e., node n2) is coupled to source/drain terminal of MP1 and gate terminal of MP2. In one embodiment, capacitor C1 (which receives Clk_d) is coupled to source/drain terminal of MP2 and gate terminal of MP1. In one embodiment, drain/source terminals of MP1 and MP2 are coupled together to provide second power supply. In one embodiment, at any given time, one of the capacitors has one of its terminal at low voltage (e.g., 0V) and another at higher voltage (e.g., 1V). In one embodiment, transistors MP1 and MP2 propagate the charge to an output node to create the second power supply.

Figure 4:
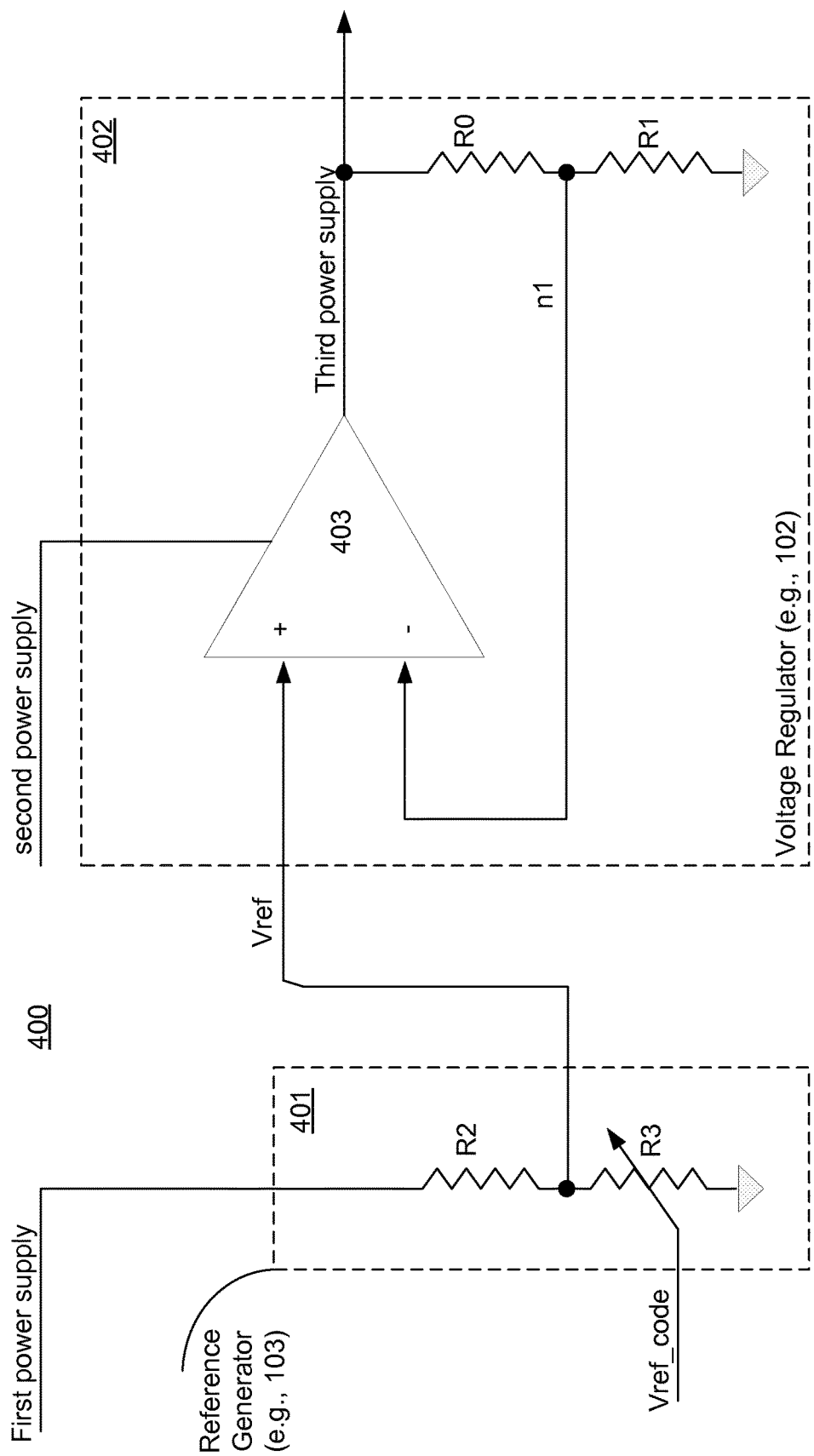
FIG. 4 illustrates architecture of a low dropout (LDO) voltage regulator (VR) and reference generator, according to one embodiment of the disclosure.

FIG. 4 illustrates architecture 400 of a low dropout (LDO) voltage regulator (VR) and reference generator, according to one embodiment of the disclosure. It is pointed out that those elements of FIG. 4 having the same reference numbers (or names) as the elements of any other figure can operate or function in any manner similar to that described, but are not limited to such.

In one embodiment, architecture 400 comprises reference generator 401 (e.g., 103 of FIG. 1) and LDO VR 402 (e.g., 102 of FIG. 1). In one embodiment, reference generator 401 comprises a voltage divider that divides first power supply to Vref, where Vref is adjustable by Vref_code. In one embodiment, the voltage divider comprises resistors R2 and R3 coupled together in series such that one terminal of resistor R2 is coupled to first power supply and the other end of resistor R2 is couple to Vref and a terminal of resistor R3. In one embodiment, resistor R3 which has another terminal coupled to ground, has variable resistance indicated by the diagonal arrow through R3. In one embodiment, resistor R2 is a number of parallel resistors that can be enabled or disabled according to Vref_code. In one embodiment, resistors R0-R3 are implemented as transistors. In other embodiments, resistors R0-R3 can be implemented as poly resistors or combination of transistors and poly resistors.

In one embodiment, LDO VR 402 comprises a comparator (or amplifier) 403 which compares Vref to voltage on node n1, where voltage on node n1 is a divided voltage of output of comparator 403. In one embodiment, amplifier 403 is powered by second power supply. In one embodiment, output of amplifier 403 is the third power supply provided to voltage sensing block 104. In one embodiment, voltage on node n1 is derived from resistors R1 coupled together in series to form a voltage divider. In one embodiment, comparator 403 adjusts third power supply when voltage sensing block 104 adjusts Vref_code which in turn adjusts Vref. The embodiments are not limited to any specific design of LDO VR. Other known implementations of LDO VR may be used for LDO VR 402.

Figure 5:
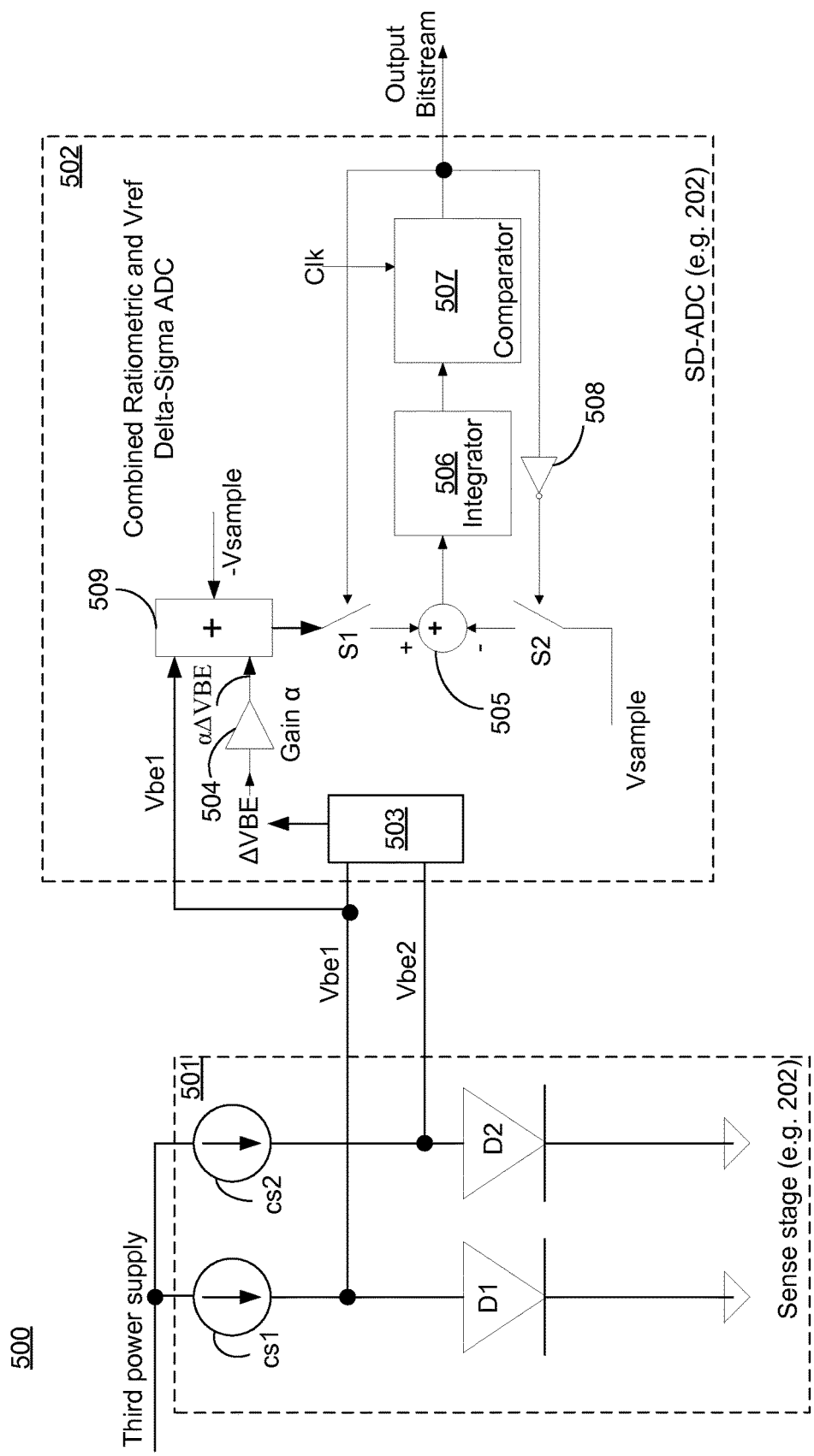
FIG. 5 illustrates architecture of a sense stage and a sigma-delta analog-to-digital converter (SD-ADC) for the thermal sensor, according to one embodiment of the disclosure.

FIG. 5 illustrates architecture 500 of a sense stage 501 and a sigma-delta analog-to-digital converter (SD-ADC) 502 for the voltage sensing block, according to one embodiment. It is pointed out that those elements of FIG. 5 having the same reference numbers (or names) as the elements of any other figure can operate or function in any manner similar to that described, but are not limited to such.

In one embodiment, sense stage 501 comprises a first current source cs1, second current source cs2, first set of diode D1, and second set of diodes D2. In one embodiment, first current source cs1 generates a fraction of current than the current generated by second current source cs2. For example, cs1 generates ⅛th current of cs2. In one embodiment, Vbe1 and Vbe2 are provided to SD-ADC 502.

In one embodiment, sense stage 501 converts the junction temperature of diodes D1 and D2 to a proportional to absolute temperature (PTAT) voltage. In one embodiment, diodes D1 and D2 form a matched pair of diodes. In one embodiment, cs1 and cs2 are implemented as current mirrors with controlled current ratios (e.g., 3.5, 4, 5, 6, 7, and 8). In one embodiment, the absolute value of the mirrored current is controlled either by an external or internal resistor and is substantially equal to a reference voltage divided by the resistor value. In one embodiment, the absolute current is designed to be a controlled value since it affects the current density within the diodes affecting their performance as thermal sensing elements. In one embodiment, the current mirrors have gain boosting arrangement (i.e., regulated cascode) in order to increase Rout (i.e., output impedance of sense stage 501), thus further stabilizing their currents.

In one embodiment, ratio currents are realized by utilizing nine identical current sources and by switching different subsets of the current to either the right diode (i.e., diode D2) or the left diode (i.e., diode D1). In one embodiment, in order to obtain accurate current ratios resilient to mismatch, Dynamic Element Matching (DEM) is used. In one embodiment, the DEM mechanism is realized by cyclically rotating the nine current source connections to the sense diodes and time-averaging the current value of the current mirrors.

In one embodiment, sense stage 501 also employs chopping to overcome diode mismatches. For example, after selecting a current ratio, for example 8:1, current sources cs1 and cs2 may be connected to diodes D1 and D2 in reverse order as well (e.g., 1:8), thus changing the sign of $\Delta V_{BE}$. By coupling the current sources in reverse order, the signal on a carrier frequency is effectively modulated, which is later demodulated by the SD-ADC 502. In one embodiment, the chopping frequency is identical to the sampling frequency of SD-ADC 501 so demodulation is back to DC.

In one embodiment, SD-ADC 502 comprises logic 503, gain stage 504, summer 505, integrator 506, comparator 507, inverter 508, switches S1 and S2, and summer 509. In one embodiment, logic 503 receives inputs Vbe1 and Vbe2 to determine difference between Vbe1 and Vbe2 to generate $\Delta V_{BE}$. In one embodiment, $\Delta V_{BE}$ is amplified by gain stage 504 with gain α. In one embodiment, switches S1 and S2 are controlled by output of SD-ADC 502, which is a bit stream.

In one embodiment, summer 509 sums Vbe1, $\alpha*\Delta V_{BE}$, and −Vsample to provide an output which is in turn provided to summer 505 via switch S1. In one embodiment, the switches couple the sum from summer 509 and Vsample in an alternating fashion (caused by alternating switching of switches S1 and S2). Proper selection of α may cause the denominator to balance the CTAT behavior of $V_{BE}$ against the PTAT behavior of $\Delta V_{BE}$, achieving the virtual Vbg within SD-ADC 502 itself. In this embodiment, the above property is used in the thermal sensor in order to omit the bandgap from the sense path (i.e., utilizing instead the natural "bandgap" that is already embedded in the sense stage).

In one embodiment, output of summer 505 is integrated by integrator 506. In one embodiment, output of integrator 506 is received by a clocked comparator 507, which is clocked by clock signal Clk. In one embodiment, output of comparator 507 is the output bit stream which is then filtered by logic 204. In one embodiment, bit stream is inverted by inverter 508. In this embodiment, bit stream and its inverted version are used to control switches S1 and S2.

In one embodiment, SD-ADC 502 is a second order, one bit, switched-capacitor based design. For embodiments with low bandwidth applications, the over-sampling ratio (OSR) may be high enough so as not to limit the resolution of SD-ADC 502. A second order SD-ADC 502 can reduce the stability problems of higher order modulators and decreases idle tone generation. Second order SD-ADC 502 also lowers requirements for the OSR and thus for the gain of the integrator amplifiers. In one embodiment, integrator parameters (gains) are defined by the ratio of capacitors which is more accurate than absolute values of RC components in continuous time modulators. In one embodiment, to reduce power supply noise and other distortions due to the common mode disturbance, a fully differential topology is used for SD-ADC 502.

In one embodiment, the second stage of SD-ADC 502 affects mostly the quantization errors and thus does not change the essential transfer function of the ADC. Charge-balance mathematics are applied to the reference-based sigma-delta, showing how the voltage ratio ($\Delta V_{BE}/V_{BG}$) is converted into an average duty ratio (or '1' density ratio) by the converter.

Figure 6:
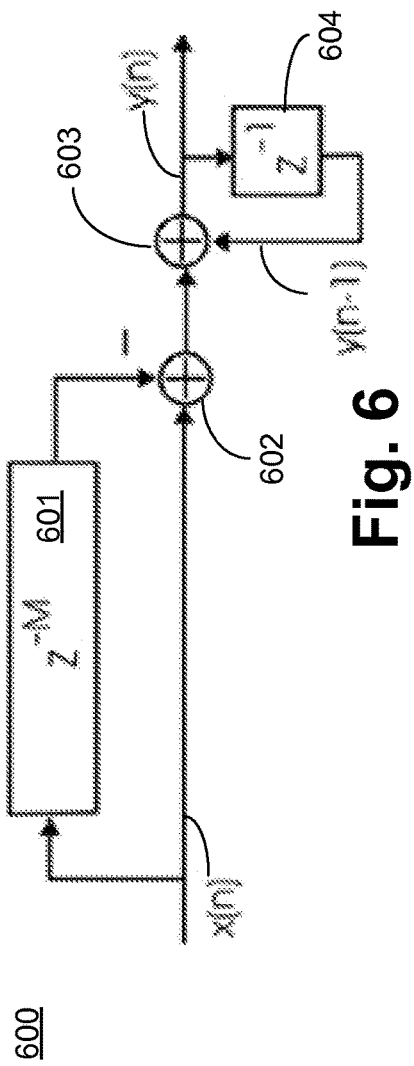
FIG. 6 illustrates logic for filtering output of SD-ADC, according to one embodiment of the disclosure.

FIG. 6 illustrates logic 600 for filtering output of SD-ADC, according to one embodiment. It is pointed out that those elements of FIG. 6 having the same reference numbers (or names) as the elements of any other figure can operate or function in any manner similar to that described, but are not limited to such. In one embodiment, logic 600 is a CIC low pass filter and comprises delay stage 601, adders 602 and 603, and delay stage 604. In one embodiment, bit stream (i.e., x[n], where 'n' is the number of bits) from SC-ADC 203 is received by delay stage 601 and adder 602. Output of delay stage 601 and adder 602 is then added to y[n−1] to generate final filtered output y[n].

Figure 7:
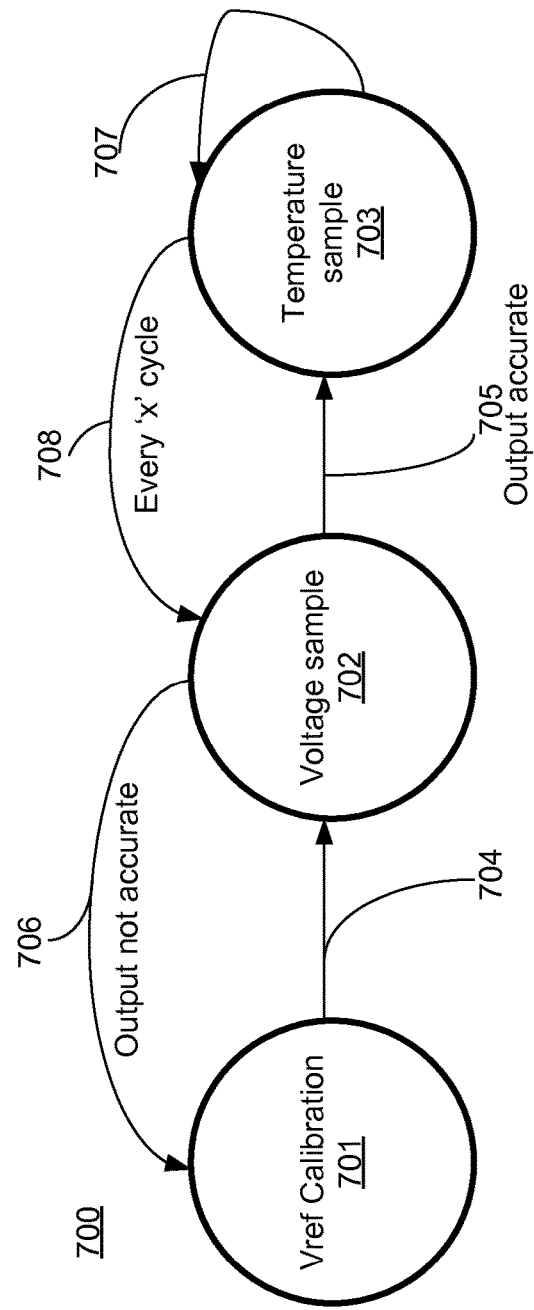
FIG. 7 illustrates a method for calibrating reference voltage and for measuring temperature, according to one embodiment of the disclosure.

FIG. 7 illustrates a method 700 for calibrating reference voltage and for measuring temperature, according to one embodiment. It is pointed out that those elements of FIG. 7 having the same reference numbers (or names) as the elements of any other figure can operate or function in any manner similar to that described, but are not limited to such.

Although the blocks in the flowcharts with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur. Additionally, operations from the various flows may be utilized in a variety of combinations.

In one embodiment, at block 701, reference generator 103 calibrates reference voltage Vref for voltage regulator 102. The generated third power supply by voltage regulator 102 is provided to SD-ADC 203 as indicated by arrow 704. In one embodiment, SD-ADC 203 samples third power supply generated by the voltage regulator 102. For example, SD-ADC 203 divides down third power supply using resistors Rs1 and Rs2 to generate Vsample which is used to sample the third power supply with Vbe1 (and/or Vbe2). In one embodiment, SD-ADC 203 compares the sampled power supply with a target voltage to determine whether the third power supply is accurate. If the third power supply is not accurate, the process proceeds back to block 701 as indicated by arrow 706. Else, the process proceeds to block 703 as indicated by arrow 705.

In one embodiment, the process of calibrating Vref in block 701 is repeated so long as sampled power supply is not accurate. At block 703, SD-ADC 203 samples temperature of diodes D1 (and/or D2) in response to comparing of the sampled power supply with the target voltage. In one embodiment, the temperature sampling occurs continuously and/or periodically as indicated by arrow 707. In one embodiment, after a predetermined number of clock cycles, the process proceeds to block 702 and third power supply is sampled again to check for accuracy as indicated by arrow 708. In one embodiment, predetermined number of cycles may be 10000 cycles. In other embodiments, other number of cycles may be used. In one embodiment, the process of calibrating the sampled power supply is repeated when the sampled power supply is not accurate.

Figure 8:
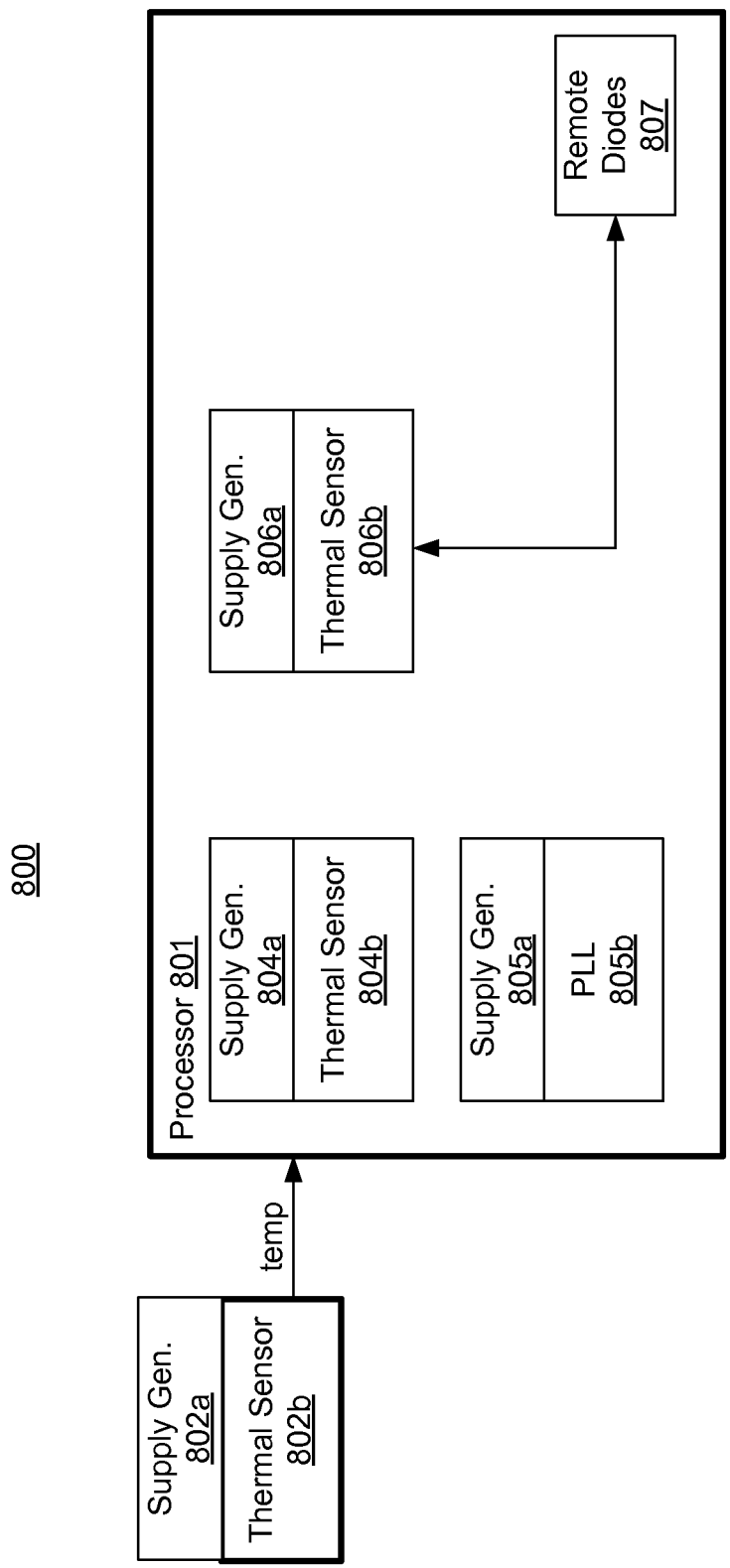
FIG. 8 is a system with the power supply generator using dynamic reference used for a thermal sensor and/or phase locked loop, according to one embodiment of the disclosure.

FIG. 8 is a system 800 with the power supply generator using dynamic reference used for a thermal sensor and/or phase locked loop (PLL), according to one embodiment of the disclosure. It is pointed out that those elements of FIG. 8 having the same reference numbers (or names) as the elements of any other figure can operate or function in any manner similar to that described, but are not limited to such.

In one embodiment, system 800 comprises pairs of supply generators and voltage sensing blocks discussed with reference to architecture 100. In one embodiment, system 800 comprises processor 801 with on-die (i.e., within processor 801) supply generator and voltage sensing block pairs. In one embodiment, system 800 also comprises an external (i.e., external to processor 801) supply generator 802*a* and voltage sensing block 802*b* pair. In this example, voltage sensing block 802*b* is a thermal sensor (e.g., voltage sensing block 104). In one embodiment, on-die supply generator and voltage sensing block pairs include supply generator 804*a* and thermal sensor 804*b* pair, supply generator 805*a* and PLL (or ADC) 805*b* pair, and supply generator 806*a* and thermal sensor 806*b* pair. In the example of thermal sensor 806*b*, diodes D1 and/or D2 of sense stage 202 are located remotely (e.g., remote diodes 807) within die to sense temperature of remote locations of the die.

Figure 9:
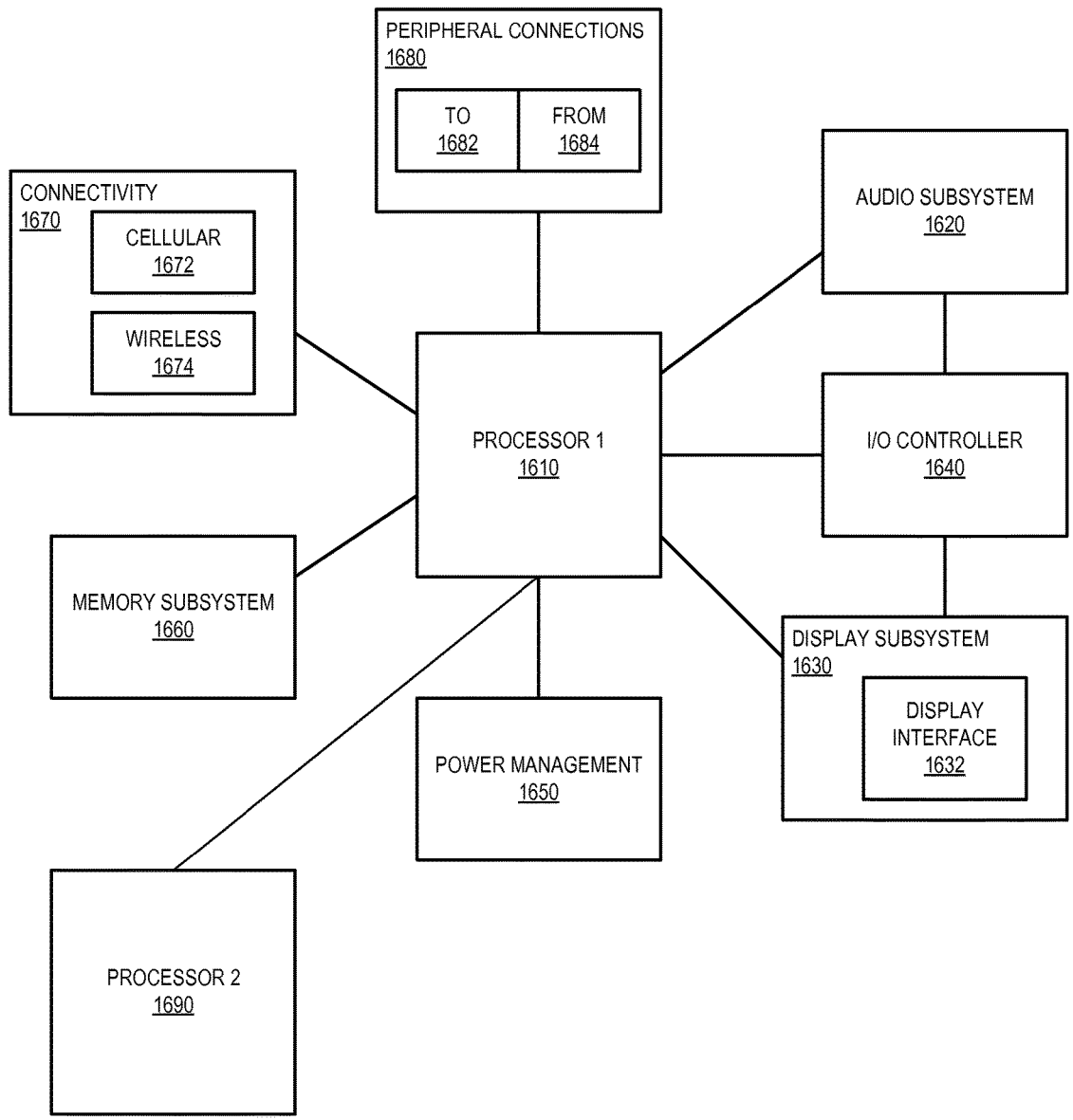
FIG. 9 is a smart device or a computer system or an SoC (system-on-chip) with the power supply generator using dynamic reference, according to one embodiment of the disclosure.

FIG. 9 is a smart device or a computer system or a SoC (system-on-chip) 1600 with the power supply generator using dynamic reference, according to one embodiment of the disclosure. It is pointed out that those elements of FIG. 9 having the same reference numbers (or names) as the elements of any other figure can operate or function in any manner similar to that described, but are not limited to such.

FIG. 9 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with the power supply generator using dynamic reference described with reference to embodiments discussed. Other blocks of the computing device 1600 may also include apparatus with the power supply generator using dynamic reference described with reference to embodiments. The various embodiments of the present disclosure may also comprise a network interface within 1670 such as a wireless interface so that a system embodiment may be incorporated into a wireless device, for example, cell phone or personal digital assistant or a wearable device.

In one embodiment, processor 1610 (and/or processor 1690) can include one or more physical devices, such as microprocessors, application processors, microcontrollers, programmable logic devices, or other processing means. Processor 1690 may be optional. While the embodiment shows two processors, a single or more than two processors may be used. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs, etc.,) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, an apparatus is provided which comprises: a charge pump to receive a first power supply and to generate a second power supply; a voltage regulator to operate using the second power supply, the voltage regulator having an input to receive a reference and to generate a third power supply; and a reference generator to operate using the first power supply, the reference generator to provide the reference according to an output of a voltage sensing block.

In one embodiment, the apparatus further comprises a load to receive the third power supply. In one embodiment, the voltage sensing block includes a sense stage to provide a difference in diode voltages or diode voltages. In one embodiment, the voltage sensing block to operate using the third power supply. In one embodiment, the voltage sensing block includes a sigma-delta analog-to-digital converter (SD-ADC) coupled to the sense stage. In one embodiment, the SD-ADC is operable to compare a version of the third power supply with a difference in diode voltages to generate a bit-stream.

In one embodiment, the voltage sensing block includes a filter to receive the bit-stream from the SD-ADC and to generate an output for controlling the reference generator. In one embodiment, the filter to output a temperature of diodes. In one embodiment, the load comprises a phase locked loop to operate using the third power supply. In one embodiment, the voltage regulator is a low dropout (LDO) based voltage regulator. In one embodiment, the LDO based voltage regulator comprises an amplifier or comparator operating on the second power supply. In one embodiment, the amplifier or comparator having a first input to receive the reference and a second input to receive a feedback associated with an output of the LDO based voltage regulator.

In one embodiment, the first power supply is a digital power supply. In one embodiment, the second power supply generated by the charge pump is an analog power supply. In one embodiment, the second power supply is higher than the first power supply, and wherein the third power supply is lower than the second power supply. In one embodiment, the charge pump comprises a first capacitor to store charge, and a second capacitor to receive charge from the first capacitor.

In another example, a method is provided which comprises: calibrating, by a reference generator, reference voltage for a voltage regulator; sampling a power supply generated by the voltage regulator; comparing the sampled power supply with a target voltage, and repeating the calibrating when sampled power supply is less than the target voltage; and sampling temperature of one or more diodes in response to the comparing.

In one embodiment, the method further comprises: sampling the power supply again after a predetermined number of sampling of temperature of the one or more diodes; comparing the sampled power supply with the target voltage, and repeating the calibrating when the sampled power supply is less than the target voltage.

In another example, a system is provided which comprises: a memory; a processor coupled to the memory, the processor having an apparatus according to the apparatus discussed above; and a wireless interface for allowing the processor to communicate with another device. In one embodiment, the system further comprises a display unit.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. An apparatus comprising:
a charge pump to receive a first power supply and to generate a second power supply;
a voltage regulator to operate using the second power supply, the voltage regulator having an input to receive a reference and to generate a third power supply; and
a reference generator to operate using the first power supply, the reference generator to provide the reference according to an output of a voltage sensing block, wherein the output of the voltage sensing block is a digital code, wherein the voltage sensing block is to operate using the third power supply, and wherein the voltage sensing block includes a sigma-delta analog-to-digital converter (SD-ADC) which is to compare a version of the third power supply with a diode voltage or a difference in diode voltages to generate a bit-stream.

2. The apparatus of claim 1 further comprises a load to receive the third power supply.

3. The apparatus of claim 2, wherein the load comprises a phase locked loop to operate using the third power supply.

4. The apparatus of claim 1, wherein the voltage sensing block includes a sense stage to provide either the diode voltage or the difference in diode voltages.

5. The apparatus of claim 4, wherein the SD-ADC is coupled to the sense stage.

6. The apparatus of claim 1, wherein the voltage sensing block includes a filter to receive the bit-stream from the SD-ADC and to generate an output for controlling the reference generator.

7. The apparatus of claim 6, wherein the filter is to output a temperature of diodes of the sensing stage.

8. The apparatus of claim 1, wherein the voltage regulator is a low dropout (LDO) based voltage regulator.

9. The apparatus of claim 8, wherein the LDO based voltage regulator comprises an amplifier or comparator operating on the second power supply.

10. The apparatus of claim 9, wherein the amplifier or comparator having a first input to receive the reference and a second input to receive a feedback associated with an output of the LDO based voltage regulator.

11. The apparatus of claim 1, wherein the first power supply is a digital power supply.

12. The apparatus of claim 1, wherein the second power supply generated by the charge pump is an analog power supply.

13. The apparatus of claim 1, wherein the second power supply is higher than the first power supply, and wherein the third power supply is lower than the second power supply.

14. The apparatus of claim 1, wherein the charge pump comprises:
a first capacitor to store charge, and
a second capacitor to receive charge from the first capacitor.

15. A system comprising:
a memory;
a processor coupled to the memory, the processor having an apparatus comprising:
a charge pump to receive a first power supply and to generate a second power supply;
a voltage regulator to operate using the second power supply, the voltage regulator having an input to receive a reference and to generate a third power supply; and
a reference generator to operate using the first power supply, the reference generator to provide the reference according to an output of a voltage sensing block, wherein the output of the voltage sensing block is a digital code, wherein the voltage sensing block is to operate using the third power supply, and wherein the voltage sensing block includes a sigma-delta analog-to-digital converter (SD-ADC) which is to compare a version of the third power supply with a diode voltage or a difference in diode voltages to generate a bit-stream; and a wireless interface to allow the processor to communicate with another device.

16. The system of claim 15 further comprises a display unit.

17. An apparatus comprising:
a first power supply node to provide a first power supply;
a second power supply node;
a charge pump coupled to the first and second power supply nodes, wherein the charge pump is to generate a second power supply for the second power supply node;
a reference generator to provide a reference voltage;
a third power supply node;
a supply generator coupled to the reference generator and the second power supply node, wherein the supply generator is to provide a third power supply on the third power supply node according to the reference voltage; and an analog-to-digital converter (ADC) coupled to the third power supply node, wherein the ADC is to generate a digital code representing the third power supply, wherein the ADC is a sigma-delta ADC (SD-ADC) which is to compare a version of the third power supply with a diode voltage or a difference in diode voltages to generate a bit-stream.

18. The apparatus of claim 17, wherein the reference generator is to dynamically adjust the reference voltage according to the third power supply.

19. The apparatus of claim 17 comprises a filter coupled to an output of the ADC, wherein the filter is coupled to the reference generator.

20. The apparatus of claim 19, wherein an output of the filter is a second digital code.

* * * * *

UNITED STATES PATENT AND TRADEMARK OFFICE
CERTIFICATE OF CORRECTION

PATENT NO. : 9,857,814 B2  
APPLICATION NO. : 14/129273  
DATED : January 2, 2018  
INVENTOR(S) : Ariel Cohen et al.

Page 1 of 1

It is certified that error appears in the above-identified patent and that said Letters Patent is hereby corrected as shown below:

Column 14, Line 35-38, Claim 10, replace "wherein the amplifier or comparator have a first input..." with "wherein the amplifier or comparator has a first input..."

Signed and Sealed this  
Twenty-second Day of May, 2018

Andrei Iancu  
*Director of the United States Patent and Trademark Office*